United States Patent [19]

Kobayashi et al.

[11] 4,400,993
[45] Aug. 30, 1983

[54] MECHANISM FOR ABSORBING ELONGATION OF A WIRE

[75] Inventors: Tetuo Kobayashi, Ikeda; Syoichi Hirai, Nishinomiya, both of Japan

[73] Assignee: Nippon Cable System, Inc., Hyogo, Japan

[21] Appl. No.: 276,802

[22] Filed: Jun. 24, 1981

[30] Foreign Application Priority Data

Feb. 12, 1981 [JP] Japan ................................ 56-19972

[51] Int. Cl.³ .............................................. F16C 1/10
[52] U.S. Cl. .............................................. 74/501.5 R
[58] Field of Search ................... 74/501 R, 501.5; 192/70.25, 111 A; 188/196

[56] References Cited

U.S. PATENT DOCUMENTS 3,163,055 12/1964 Jeffree .................................. 74/501.5
3,473,407 10/1969 Hicks ................................... 74/501.5

FOREIGN PATENT DOCUMENTS 54-31143 10/1979 Japan .
510013 7/1939 United Kingdom ............... 74/501.5

Primary Examiner—Henry Jaudon
Attorney, Agent, or Firm—Armstrong, Nikaido, Marmelstein & Kubovcik

[57] ABSTRACT

A mechanism for absorbing elongation of a wire in a power transmission device comprising two coaxial pulleys, i.e., ratchet pulley and winding pulley, winding both end portions of the wire respectively in the opposite direction; a ratchet roller connecting with the ratchet pulley by means of ratchet and engaging to the winding pulley, whereby the elongation of the wire can be absorbed by winding only one end portion of the elongated wire around either the ratchet pulley or the winding pulley.

2 Claims, 6 Drawing Figures

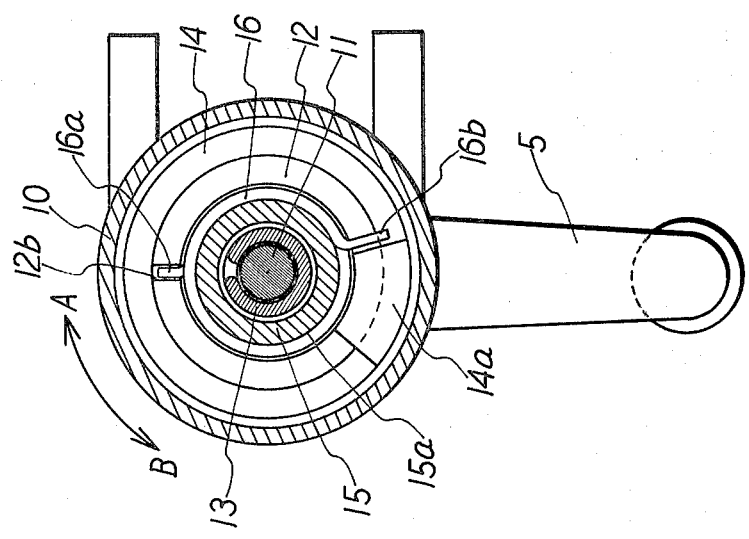
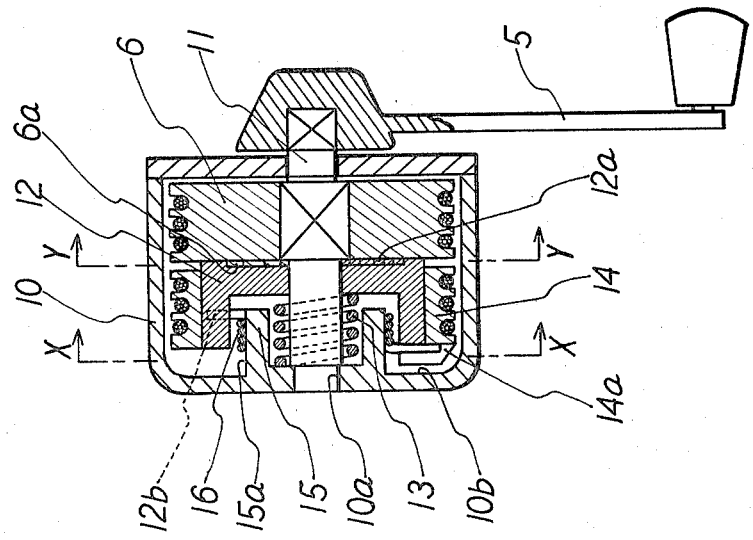

MECHANISM FOR ABSORBING ELONGATION OF A WIRE

BACKGROUND OF INVENTION

The present invention relates to a novel mechanism for absorbing elongation of a wire, and more particularly to a mechanism for absorbing elongation of the wire connecting a driving device and a working device, so that the working device is exactly functioned by the driving device.

The wire comprising a strand of metal wire elements generally generates permanent elongation under a tension load. Permanent elongation never return the elongated wire to its initial length. The degree of elongation becomes larger during an initial stage in use, but gradually becomes smaller, and the wire finally results in almost non-elongation.

Elongation of the wire generates idle time between the driving device and the working device in these functions, whereby the working device cannot be exactly functioned, and does not be stable to a constant state.

Until now, in order to absorb elongation of the wire, a wire length-adjusting member comprising a bolt-nut system has been connected to an end position or a suitable position of the wire, and elongation of the wire has been removed by driving the bolt-nut. Also, there is another method employing a tension pulley which is moved to remove elongation of the wire. However, in these mechanisms, elongation of the wire must be adjusted in each time. Also, the adjustment work is very troublesome, and some securing positions bring difficulties into the adjustment work.

OBJECTS OF THE INVENTION

The main object of the invention is to provide a mechanism for absorbing elongation of a wire which can automatically absorb the elongation of the power transmission wire connected between a driving device and a working device, and which can drive the working device under a constant tension.

The further object of the invention is to provide a mechanism for absorbing elongation of a wire which can eliminate the adjustment of the wire elongation in its assembling.

Other objects and advantages of the invention will become apparent from the following description.

BRIEF DESCRIPTION OF THE DRAWINGS

FIG. 3 is a sectional view of the mechanism shown in FIG. 2 and secured to a driving device;

FIG. 4 is a sectional view taken along line X—X of FIG. 3;

DETAILED EXPLANATION OF THE INVENTION

Figure 1:
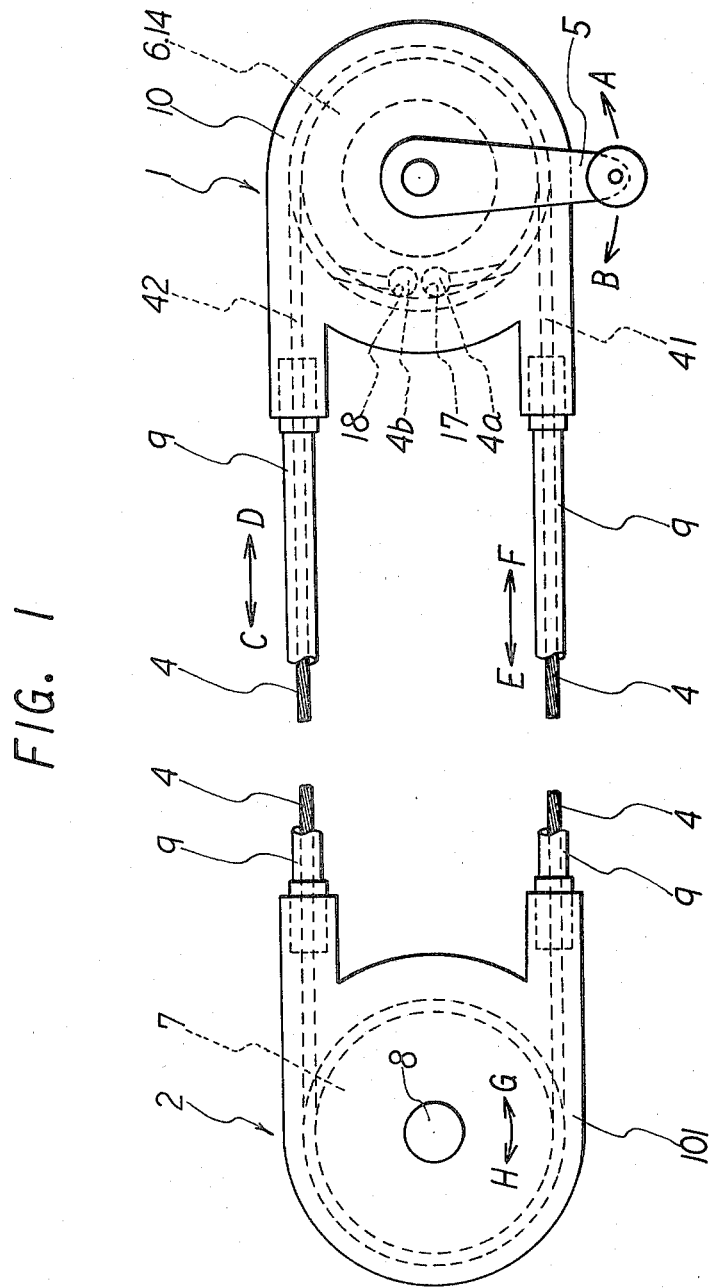
FIG. 1 is a front view for showing a transmission device employing a mechanism for absorbing elongation of a wire of the invention.

As shown in FIG. 1, a transmission device which use the mechanism of the invention consists of a driving device 1, a working device 2, and a wire 4 inserted through a guide tube 9 to connect both device.

Both ends of the wire are respectively engaged to each suitable position of both pulleys 6 and 14 in a casing 10 of the driving device 1 and are wound around those, so that when a lever 5 of the driving device 1 is rotated in the direction A, one end 41 of the wire 4 is pulled into the casing 10 of the driving device, while the other end 42 of the wire 4 is pulled out of the casing 10. Therefore, a pulley 7 of the working device 2 is rotated to drive a shaft 8 in the direction G. On the contrary, when the lever 5 is rotated in the direction B, the shaft 8 is driven in the direction H.

Such a reciprocating action of the wire results in remotely controlling the operation of various working devices, for example, opening or closing action of window (e.g., window opening-closing regulator in automobile and construction), opening or closing action of cock or valve, and operation of lever.

When the load to the shaft 8 is large, the wire 4 generates elongation, and as a result, the shaft 8 causes an idle time in its rotation against the rotation of the lever 5. The idle time does not accurately work the shaft 8 against the rotation of the lever 5, and further even if the rotation of the lever 5 is stopped, it is unavoidable that the shaft 8 is rotated in the direction G or H in some degree, whereby the function of the working device becomes unstable.

Figure 2:
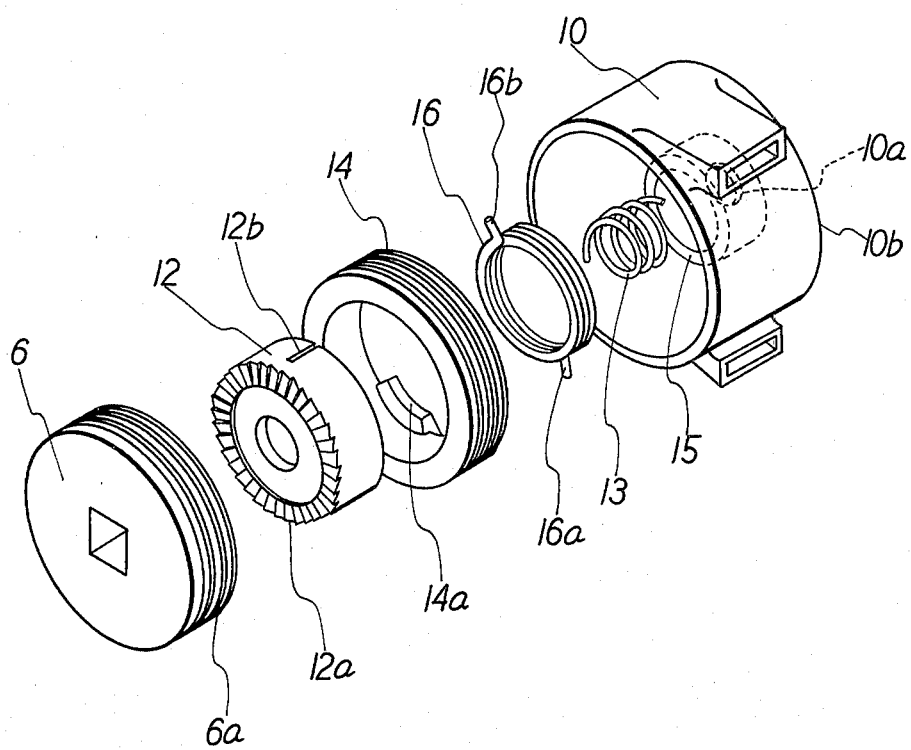
FIG. 2 is an exploded view for showing an embodiment of a mechanism for absorbing elongation of the wire of the invention.

FIG. 2 shows the mechanism of the invention, and FIG. 3 shows the embodiment that the mechanism of the invention is adapted to the driving device 1.

In FIG. 3, a shaft 11 to which a lever 5 is secured is rotatably supported by the casing 10. The shaft 11 is inserted through and engaged to a ratchet pulley 6, so that the pulley 6 is rotatable together with the shaft 11. One side surface of the pulley 6 is provided with first rachet teeth 6a having a suitable width over all the circumference. Furthermore, a bottomed tubular ratchet roller 12, which is adjacent to the ratchet pulley 6, and one side surface of which is provided with second ratchet teeth 12a being capable of engaging with the first ratchet teeth 6a, is rotatably supported by the shaft 11, is axially movable in some degree, and is depressed to the rachet pulley 6 by a spring member 13.

Also, a tubular winding pulley 14 is rotatably disposed to an outer circumference of the ratchet roller 12, and has an adjusting projection 14a shaped as a fan and projected radially inward at a suitable position of one side surface opposite to facing the ratchet pulley 6.

A tubular clutch boss 15 which is concentric with an axial hole 10a provided in a center of a bottom 10b in the casing 10 is provided on and axially projected from the bottom 10b inward, and further a clutch spring 16 is wound on an outer circumference of the boss 15. One end 16a of the clutch spring is engaged with a clutch spring-engaging groove 12b provided to the ratchet roller 12, while the other end 16b of the clutch spring is contacted with the above adjusting projection 14a provided on the winding pulley 14.

A nearly central area of the wire is wound around the pulley 7 of the working device 2 as shown in FIG. 1 with at least one cycle or several cycles. One end portion 42 introduced from a casing 101 of the working device to exterior is wound around the ratchet pulley 6, and its top end 4a is fixedly secured in a recess 17 provided on the ratchet pulley 6 (see FIG. 5). The other end portion 41 is wound around the winding pulley 14, and its top end 4b is fixedly secured in a recess 18 provided on the winding pulley 14 (see FIG. 6).

Hereinafter, the functions and advantages of the invention will be explained.

Figure 5:
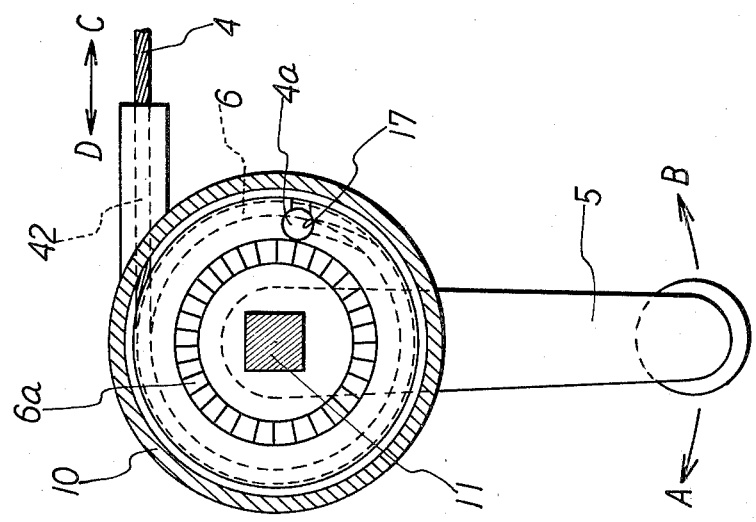
FIG. 5 is a sectional view taken along line Y—Y of FIG. 3.

In FIG. 5, when the lever 5 is rotated in the direction A, the ratchet pulley 6 is rotated in the direction A by the shaft 11, and simultaneously the ratchet roller 12 having the second ratchet teeth 12a engaged with the first ratchet teeth 6a is also rotated in the direction A (in this embodiment, both ratchet teeth 6a and 12a are engaged together at the rotation in the direction A). Thus, one end 16a of the clutch spring 16, which is engaged with the clutch spring-engaging groove 12b provided to the ratchet roller 12, is pushed and rotated in the direction A. That is to say, in that case, since the clutch spring 16, which is wound around the outer circumference 15a of the clutch boss 15, is pushed in the direction of the recoil, the clutch spring 16 is rotated, and therefore the other end 16b of the clutch spring 16 pushes the adjusting projection 14a to rotate the winding pulley 14 simultaneously in the direction A, whereby one end portion 41 of the wire is pulled in the direction F, and is wound around the winding pulley 14.

Thus, the wire 4 urges the pulley 7 of the working device 2 to rotate in the direction G, and as a result, the other end 42 of the wire is pulled in the direction C to convey the wire 4 out of the ratchet pulley 6.

As mentioned above, by rotation of the lever 5 in the direction A, the ratchet pulley 6, the ratchet roller 12 and the winding pulley 14 are incorporated as if they are rotated as one pulley, and the winding-up and the winding-off of the wire 4 are performed in the winding pulley 14 and the ratchet pulley 6, respectively. However, in that case, elongation of the wire is not absorbed.

Figure 6:
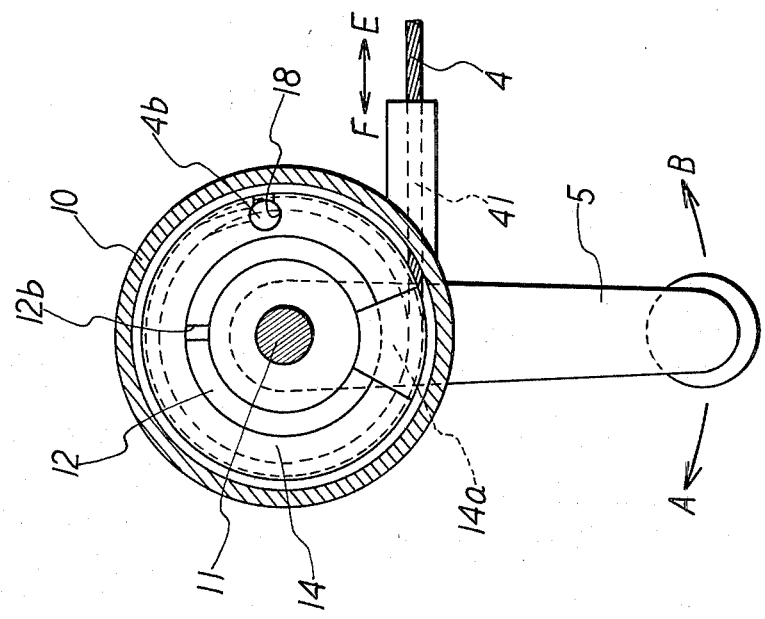
FIG. 6 is a schematically sectional view taken along line X—X of FIG. 3 for showing the engagement of both ends of the wire.

On the other hand, when the lever 5 is rotated in the direction B, the ratchet pulley 6 is rotated in the direction B, and winds up one end portion 42 of the wire 4. If the wire is enoughly stretched without slack, the wire 4 rotates the pulley 7 of the working device in the direction H, and the other end portion 41 of the wire 4 is pulled out in the direction E as shown in FIG. 6. As a result, the winding pulley 14 is rotated in the direction B, and the adjusting projection 14a pushes the other end 16b of the clutch spring 16 in the direction B. Thus, the clutch spring 16 is pushed in the direction of recoil, and is rotated in the direction B, and the ratchet roller 12 in which the end 16a of the clutch spring 16 is engaged is rotated in the direction B without racing.

When the wire is stretched enoughly, the torque given to the ratchet pulley 6 urges that the wire 4 is wound up to the ratchet pulley 6 to work the working device 2, and further is pulled out of the winding pulley 14. In that case, both the ratchet pulley 6 and the ratchet roller 12 are in the state of the balance, since those ratchet teeth are engaged together, and therefore rotate together winthout slipping.

In the embodiment as shown in FIGS. 2 to 6, when elongation is generated in the wire 4, it can be absorbed by rotating the lever 5 in the direction B. That is to say, in the case that the lever 5 is rotated in the direction B in FIG. 5 to pull the end portion 42 of the wire 4 in the direction D and to wind it around the ratchet pulley 6, elongation of the wire 4 does not immediately pull the other end portion 41 in the direction E, and the winding pulley 14 is in the state of stop without rotation. That is to say, since the adjusting projection 14a does not push the end 16b of the clutch spring 16 in the direction B, the clutch spring 16 keeps coiling tightly around the outer surface 15a of the clutch boss 15. Accordingly, the ratchet roller 12 in which the end 16a of the clutch spring is engaged in the clutch spring-engaging groove 12a is locked without rotation, but only the ratchet pulley 6 can be raced in the direction B to wind up the wire 4. As a result, elongation of the wire can be absorbed. After absorbing elongation, the end portion 41 of the wire 4 is pulled in the direction E to rotate the winding pulley 14 in the direction B, and the adjusting projection 14a releases the lock due to the clutch spring, whereby the ratchet roller 12 begins to rotate. Accordingly, the mechanism of the invention can accurately function the working device.

In addition, though it is necessary in the conventional device to adjust the tension of the wire in the case of assembling the device, so that it is very troublesome in handling, according to the invention, it is easy to get the desired tension by merely winding the wire around each pulley suitably in advance, because when the lever 5 is rotated in the direction B until the wire 4 has a suitable tension, the ratchet pulley 6 in which the end portion of the wire 4 is engaged is raced to wind up the wire 4, and when the wire reaches to a certain tension, the winding pulley 14 engaged to the other end portion of the wire 4 also begins the rotation in the direction B.

In these explanations, though it is explained as a preferable embodiment that the mechanism of the invention is employed to the driving side, the mechanism of the invention may be employed to the working side.

Also, in the above explanations, though it is explained as an embodiment about the device employing only one wire 4, two wires may be employed for connecting between the driving device and the working device by both ends of each wire.

Generally, permanent elongation of a wire becomes larger in the initial stage, and is generated over a comparative long period of time. Also, the long wire becomes more larger in elongation than the short wire. Therefore, in the conventional adjusting mechanism employing the bolt-nut system, there is a certain limit in the ability for absorbing elongation of the wire. However, according to the invention, since the ratchet teeth are provided over all the circumference side surface of each pulley, absorbing elongation of the wire is not limited, and elongation of the wire can automatically absorbed.

Further, though a wire guide is provided on each outer surface of the ratchet pulley and the winding pulley as shown in FIGS. 2 and 3, it will be obvious to those skilled in the art that the guideless pulleys also has the same advantages as in those having guide.

What is claimed is:

1. A mechanism for absorbing elongation of a wire comprising
   a ratchet pulley having a first ratchet teeth over all a circumference of one side surface, a shaft rotatably supported to a casing being inserted into and engaged with said ratchet pulley, and one end portion of the wire being wound around said ratchet pulley;
   a ratchet roller being adjacent to said ratchet pulley, being rotatably supported to the shaft and axially movable, having a second ratchet teeh capable of engaging with said first ratchet teeth, and having a clutch spring-engaging groove at the other side surface;

a tubular winding pulley for the wire being rotatbly arranged to an outer surface of said ratchet roller, and having an adjusting projection shaped as a fan and projected radially inward at one end surface;

a spring member urging said ratchet roller to the ratchet pulley side;

a clutch spring for regulating the rotation of said ratchet roller; and a tubular clutch bos axially projected from a bottom of said casing in order to coil said clutch spring, whereby elongation of the wire wound up or off by said pulleys is automatically absorbed.

2. The mechanism of claim 1 wherein one end of said clutch spring is engaged to said clutch spring-engaging groove of said ratchet roller, while the other end is contacted with said adjusting projection of the winding roller, and the clutch spring is coiled around said clutch boss when said ratchet pulley and ratchet roller are rotated in the direction of generating slip between said first and second ratchet teeth.

* * * * *